United States Patent Office 3,449,436
Patented June 10, 1969

3,449,436
PURIFICATION OF KETONES
Patrick J. O'Connor and Edward P. Maglaughlin, Pampa, Tex., assignors to Celanese Corporation, New York, N.Y., a corporation of Delaware
No Drawing. Filed Feb. 17, 1966, Ser. No. 528,106
Int. Cl. C07c 49/10; B01j 11/82
U.S. Cl. 260—593                                     5 Claims

ABSTRACT OF THE DISCLOSURE

A ketone, for example methyl ethyl ketone, is recovered from a mixture in which it is admixed with a tertiary alcohol, especially tertiary butanol, by a process which comprises subjecting the mixture to reaction conditions whereby the alcohol is dehydrated to the corresponding olefin, after which the ketone is readily separated from the olefin by distillation. The dehydration is advantageously accomplished by bringing the mixture, in the vapor phase and at elevated temperature, into contact with a solid dehydration catalyst comprising, for example, activated alumina either alone or impregnated with phosphoric acid.

---

This invention relates to the purification of ketones containing impurities comprising tertiary alcohols.

More particularly it relates to the purification of methyl ethyl ketone contaminated with tertiary alcohols.

Specifically it relates to the removal of tertiary-butanol from methyl ethyl ketone.

The purification of ketones of normal volatility, that is ketones which can be distilled at temperatures below those at which thermal degradation of the ketones in question will occur, is normally compartively straightforward and consists essentially of distillation together with auxiliary chemical treatments to improve such characteristics as odor and color. However, certain impurities have boiling points so close to those of the ketones from which they must be separated that separation by straightforward distillation methods is difficult or impossible. A case in point is the separation of methyl ethyl ketone from tertiary butanol. The relative volatility between these two compounds is extremely low, and simple distillation is not feasible in effecting a complete separation between them. A water-extractive distillation can be employed for this separation, but this requires large quantities of steam and therefore is expensive.

Methyl ethyl ketone recovered from the products of the liquid phase oxidation of hydrocarbons contains tertiary butanol, which affects its quality and therefore its salability, so the problem of separating these two compounds is one which is of current commercial importance and for which the existing technology has not afforded a completely satisfactory solution.

It is an object of the present invention to provide a method for efficiently and economically removing tertiary butanol from methyl ethyl ketone.

It is another object of the invention to provide a method of general applicability for removing tertiary alcohols from ketones in general.

Other objects of the invention will be apparent from the following detailed description and example.

In accordance with the present invention a ketone in admixture with a tertiary alcohol is subjected to reaction conditions under which the tertiary alcohol is dehydrated to the corresponding iso-olefin while the ketone is not affected. The product of this dehydration comprises the ketone and the iso-olefin, which are easily separable from each other by distillation or other straightforward methods. While the following example deals with the removal of tertiary butanol from methyl ethyl ketone, the method is of general applicability to the removal from ketones of tertiary alcohols which boil near said ketones, since it is generally the case that, if a given tertiary alcohol boils near a given ketone, the iso-olefin derived from the tertiary alcohol will have a boiling point substantially different from that of the alcohol and therefore substantially different from that of the ketone in question. In essentially all cases the iso-olefin will be more volatile than the corresponding tertiary alcohol, and therefore can be removed from the system easily as a distillate.

The following example is given to illustrate the invention further.

Example I

Per hour, 552 pounds of a mixture containing 490 pounds of methyl ethyl ketone, 7 pounds of ethyl acetate, 13 pounds of tertiary butanol, and 42 pounds of other organic materials are fed continuously to a steam-heated vaporizer wherein the material is vaporized. The vapors are then superheated in a second heat exchanger to a temperature of 680° F., following which they are passed through a dehydration reactor consisting of a 7 cubic foot cylindrical vessel packed with 4 cubic feet of a dehydration catalyst consisting of alumina granules of approximately 8–14 mesh which have been impregnated with 5 weight percent of phosphoric acid. The dehydration reactor is maintained at approximately 700° F. and 34 pounds per square inch absolute. The gaseous dehydration product flowing from the reactor contains 486 pounds per hour of methyl ethyl ketone, 10 pounds per hour of isobutylene, 3 pounds per hour of water, and 53 pounds per hour of other materials. There is less than one pound per hour of unreacted tertiary butanol, a quantity small enough that, despite the closeness of the boiling points, it can be removed from the product by distillation.

The effluent stream from the dehydration reactor is fed to a distillation tower having 60 trays and operating at a reflux ratio of 25:1 under a pressure of 13 pounds per square inch absolute, measured at the top, and at a temperature of 152° F., also measured at the top. From this tower a distillate containing 145 pounds per hour of methyl ethyl ketone and 17 pounds per hour of low-boiling compounds is withdrawn from the system and employed elsewhere for purposes outside the scope of the invention. From the base of the tower a residue stream is withdrawn containing 330 pounds per hour of methyl ethyl ketone and 30 pounds per hour of other organic compounds. This residue is forwarded to a finishing distillation in a tower having 60 trays, operating at a temperature of 169° F. and a pressure of 13 pounds per square inch absolute measured at the top, and at a reflux ratio of 10:1. The residue stream from this second tower, containing 30 pounds per hour of methyl ethyl ketone and 30 pounds per hour of other organic compounds, is withdrawn and forwarded to other facilities for uses outside the scope of the invention. The distillate from this second tower contains 300 pounds per hour of commercially-pure methyl ethyl ketone, which is the final product.

Under the operating conditions described in the foregoing example, and with a typical commercially available feedstock as employed in the example, it has been found that the activity of the dehydration catalyst slowly declines with time as it becomes fouled with various solid impurities. It has been found desirable to regenerate the catalyst, at intervals of approximately 30 days, by passing through it a gas containing molecular oxygen, such as air, at a temperature between about 680° F. and 1000° F. for about 4 hours. Steam is injected into this gas as needed to prevent the temperature during this regeneration from rising above about 1000° F. Any inert gas can be used in place of steam, but steam is preferred as being effective and readily available.

The foregoing example describes one particular embodiment of the invention, to which it is not, however, limited. For example, as catalyst support activated alumina is preferred since it is physically strong, readily available, has desirable characteristics in the matter of adsorbing catalytic materials such as, in this case, phosphoric acid, and is in itself a reasonably satisfactory dehydration catalyst without incorporating other materials therewith. (Adding phosphoric acid to the alumina, in an amount of about 3% to 10% by weight, allows operation at a lower temperature than when using alumina alone.) Other materials can be employed, however, such as the less active or inactive grades of alumina, bauxite, and other porous and heat-resistant materials such as silica gel and ceramic materials. In place of phosphoric acid many other dehydration catalysts can be employed, including metal salts of phosphoric acid, polyphosphates, and mixtures of free phosphoric acid with salts thereof. Dehydration catalysts in the liquid phase can also be employed, for example strong sulfuric acid or phosphoric acid. For example, the ketone-alcohol mixture can be bubbled through concentrated phosphoric acid at a temperature of about 150° F. to 300° F. to effect substantially the same result as described in the foregoing example. However, a solid catalyst bed as described in the example is preferred for its simplicity and also because it has been found that this effects a more complete conversion of tertiary alcohol to iso-olefin per pass while causing minimal losses of methyl ethyl ketone.

Among the many dehydration catalysts suitable for the practice of this invention are tungstic oxides, molybdenum oxides, alumina, silica, zirconia, thoria, sulfides of metals of Groups VI and VIII of the Periodic Table, titanium oxide, mixtures of ferric oxide with titania, tungstites of nickel, cobalt, copper, and iron, metallic fluorides, permanganates, aluminates and silicates of metals of the iron transition group, metallic copper coated with copper phosphates, and phosphoric acid impregnated upon carbides of titanium, zirconium, or silica.

Dehydration reaction pressure is not critical, provided it is low enough that, at the temperature employed, substantially all of the reactants will remain in the vapor state. The dehydration of tertiary alcohol to iso-olefin per pass increases somewhat with decreasing reactor pressure, but the effect is not critical and the pressure employed in the foregoing example is satisfactory.

Reaction temperature can be varied substantially, although it should be above the dewpoint of the alcohol-ketone mixture fed to the reactor and below the temperature at which the ketone being handled suffers thermal degradation. These limits will vary somewhat depending upon the feedstock being processed. For mixtures of tertiary-butanol and methyl ethyl ketone, the reaction temperature should be at least 350° F. and preferably not more than about 750° F. The preferred range is from 500° F., below which the dehydration reaction will be incomplete and some recycle of unreacted tertiary butanol will therefore be required, to 750° F., above which but little further reaction is obtained and unnecessary expense for process heat is incurred.

The ratio of catalyst volume to process throughput is not critical, but for processing a stream as described in the example approximately 0.6 to 1.0 cubic foot of catalyst bed is recommended per 100 pounds of feedstock per hour. Smaller quantities of catalyst will require either higher reaction temperatures or else operation with a partial conversion of tertiary butanol per pass with a resulting need to recover from the dehydration reaction products a tertiary-butanol fraction for recycle to the dehydration reactor. Larger quantities of catalyst have no adverse effect and will allow operation at comparatively low temperatures and at high conversion per pass.

The ratio of tertiary alcohol to ketone in the fraction being processed can vary widely, although as a practical matter the invention is best adapted to the processing of fractions in which the tertiary alcohol is a comparatively minor component. This is not for chemical reasons but rather for the reason that the tertiary alcohol is degraded to an olefin in this process, and such degradation of large amounts of an alcohol would be wasteful. In the case of tertiary-butanol and methyl ethyl ketone, for example, straightforward distillation methods can be employed to resolve a mixture containing large amounts of tertiary-butanol to one containing about 10 to 15 percent tertiary butanol before expensive techniques such as water-extractive distillation have to be employed. In such a case, such a preliminary distillation to recover as much a tertiary-butanol as is economically feasible is economically advantageous, after which the resulting mixture of ketones and lesser quantities of the alcohol can be treated by the process of this invention.

As has been pointed out, the invention is not limited to mixtures of tertiary-butanol and methyl ethyl ketone. The dehydration reaction is characteristic of substantially all tertiary alcohols having at least one hydrogen atom on a carbon atom adjacent to that to which the hydroxy group is attached. Likewise, in substantially every case the iso-olefin resulting from the dehydration of a tertiary alcohol has a boiling point substantially different from that of the alcohol and consequently can be removed easily from the dehydration reaction products, which will consist primarily of the ketone, the boiling of which is close to that of the original tertiary alcohol which has been dehydrated. It is not necessary, of course, to employ the process of the invention unless the ketone and the alcohol do boil close to one another. Substantially any ketone can be treated by the process of this invention provided it is thermally stable and not subject to polymerization or condensation reactions in the presence of the dehydration catalyst at a temperature at which the dehydration reaction can be effected. That is, the ketone should be stable in the reaction environment at a temperature of at least about 350° F.

While the invention is not limited to the treatment of these alone, it is particularly applicable to the treatment of simple aliphatic ketones such as the ketoalkanes methyl ethyl ketone, methyl propyl ketones, and methyl butyl ketones; cyclic ketoalkanes such as cyclohexanone and alkyl cyclohexanones; and phenyl ketoalkanes. Hydroxy ketones and halogen-substituted ketones may tend to dehydrate or dehydrohalogenate as the case may be if the substituent group is near the carbonyl carbon atom. Unsaturated ketones may not be stable if the ethylenic linkage is close to the carbonyl carbon atom. For example, methyl isopropenyl ketone is not particularly stable.

The system chosen for recovering the purified ketone from the dehydration reactor product is not limited to that described in the example above. This purification system, like the reaction system itself, can be operated either batchwise or continuously, although continuous operation is normally preferable. Various dehydration feedstocks will contain various impurities, with the result that the optimum product recovery system may be different in each case. Given an analysis of the dehydration product to be purified, however, those skilled in the art will be able to design such a system by straightforward chemical engineering techniques.

It is to be understood that the foregoing detailed description is merely given by way of illustration and that many variations may be made therein without departing from the spirit of our invention.

The embodiments of the invention in which an exclusive property or privilege is claimed are defined as follows:

1. A process for converting a feedstock comprising predominantly methyl ethyl ketone and tertiary butanol into a fraction comprising methyl ethyl ketone with a greatly reduced tertiary butanol:methyl ethyl ketone ratio as compared with that of said feedstock, which process comprises:

(a) contacting said feedstock, in the vapor phase and at a temperature between about 350° F. and about 750° F., with a dehydration catalyst to dehydrate the tertiary butanol component of said feedstock to isobutylene and form a dehydration product comprising methyl ethyl ketone and isobutylene; and (b) separating said dehydration product, by distillation, into (1) a distillate comprising a portion of the methyl ethyl ketone contained in said dehydration product together with low-boiling components of said dehydration product, and (2) a residue comprising predominantly methyl ethyl ketone.

2. The process of claim 1 wherein the dehydration catalyst is in the form of a bed of solids through which the vaporized feedstock is passed.

3. The process of claim 2 wherein the dehydration catalyst comprises a solid support selected from the group consisting of activated alumina, inactive alumina, bauxite, silica gel, and porous ceramics, impregnated with at least one member of the group consisting of phosphoric acid, polyphosphates, and metal salts of phosphoric acid.

4. The process of claim 2 wherein the dehydration catalyst comprises a member of the group consisting of (a) activated alumina and (b) alumina impregnated with phosphoric acid.

5. The process of claim 4 wherein the feedstock is contacted with the dehydration catalyst at a rate such that the ratio of catalyst bed volume to feedstock throughput is at least about 0.5 cubic food of catalyst bed per 100 pounds of feedstock passed therethrough per hour.

References Cited

UNITED STATES PATENTS 3,047,630    7/1962    Addy _____ 260—593

DANIEL D. HORWITZ, *Primary Examiner.*

U.S. Cl. X.R.

252—435, 437, 439, 441, 449, 461, 462, 463, 466, 467; 260—586, 590, 591, 682